(12) United States Patent
Kaneko et al.

(10) Patent No.: US 7,340,095 B2
(45) Date of Patent: Mar. 4, 2008

(54) SUBJECT ESTIMATING METHOD, DEVICE, AND PROGRAM

(75) Inventors: Kiyotaka Kaneko, Kaisei-machi (JP); Kazuo Shiota, Tokyo (JP)

(73) Assignee: FUJIFILM Corporation, Kanagawa-ken (JP)

( * ) Notice: Subject to any disclaimer, the term of this patent is extended or adjusted under 35 U.S.C. 154(b) by 790 days.

(21) Appl. No.: 10/742,874

(22) Filed: Dec. 23, 2003

(65) Prior Publication Data

US 2004/0135890 A1     Jul. 15, 2004

(30) Foreign Application Priority Data

Dec. 27, 2002  (JP) .............................. 2002-379061

(51) Int. Cl.
*G06K 9/00* (2006.01)
*G06K 9/40* (2006.01)
*H04N 5/76* (2006.01)

(52) U.S. Cl. .................. 382/181; 348/231.5; 382/190; 382/254; 382/278

(58) Field of Classification Search ................ 382/225, 382/254, 294, 305, 312, 181, 190, 278, 284, 382/291; 355/38, 40; 396/323, 567; 348/207.1, 348/231.2

See application file for complete search history.

(56) References Cited

U.S. PATENT DOCUMENTS 5,124,915 A * 6/1992 Krenzel ......................... 702/5
6,512,857 B1 * 1/2003 Hsu et al. .................... 382/294
6,597,818 B2 * 7/2003 Kumar et al. ............... 382/294
6,847,733 B2 * 1/2005 Savakis et al. ............. 382/225
7,145,597 B1  12/2006 Kinjo

FOREIGN PATENT DOCUMENTS

JP      2001-36842 A      2/2001
JP      2001-228528 A     8/2001
JP      2001-238177 A     8/2001

* cited by examiner

*Primary Examiner*—Kanjibhai Patel
(74) *Attorney, Agent, or Firm*—Birch, Stewart, Kolasch & Birch, LLP

(57) ABSTRACT

A personal computer issues an instruction to estimate a subject included in an image represented by image data stored in an image server. A database in which a place of photography, time periods, and a photographing direction correspond to structure image data representing a structure is stored in a storage unit of a subject estimating device in the image server. Related structure image data related to the place of photography and the photographing direction and a date/time of photography, are extracted from the database by referring to the position data and the date/time data attached to the image data. Then, a correlation value between the extracted related structure image data and the image data is obtained, and a structure included in an image represented by a related structure image data with the highest correlation value is estimated to be a subject included in the image represented by the image data.

18 Claims, 3 Drawing Sheets

FIG.2
DB1
| PLACE | TIME PERIOD | PHOTOGRAPHING DIRECTION | STRUCTURE NAME | STRUCTURE IMAGE DATA |
|---|---|---|---|---|
| SHIBA AREA | ~1957 | | ZOJO-TEMPLE |  |
| | | | SHIBA PARK | 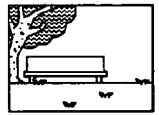 |
| | 1958~ | | ZOJO-TEMPLE |  |
| | | | SHIBA PARK |  |
| | | | TOKYO TOWER |  |
| SHINJUKU STATION WEST EXIT | ~1991 | NORTHWEST | △△ BUILDING | 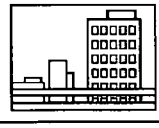 |
| | | | □□ BUIDLING |  |
| | 1992~ | WEST | TOKYO METROPOLITAN GOVERNMENT OFFICE |  |
| | | NORTHWEST | △△ BUILDING |  |

US 7,340,095 B2

SUBJECT ESTIMATING METHOD, DEVICE, AND PROGRAM

This Nonprovisional application claims priority under 35 U.S.C. § 119(a) on patent application No(s). 2002-379061 filed in Japan on Dec. 27, 2002, the entire contents of which are hereby incorporated by reference.

BACKGROUND OF THE INVENTION

1. Field of the Invention

The present invention relates to a subject estimating method and a subject estimating device for estimating a subject which is a structure such as a building and a landscape, included in an image. The present invention also relates to a program for causing a computer to execute the subject estimating method.

2. Description of the Related Art

Conventionally, image data obtained by reading out an image recorded on a negative film or image data obtained using a digital camera are organized and stored. However, as the amount of the image data increases, the more troublesome organization work of the image data becomes. Especially, in a case that the image data are obtained using the digital camera which requires no film cost, there is a tendency that a large amount of image data is obtained. As a result, the organization work of the image data becomes extremely troublesome. Therefore, various methods have been proposed wherein the image data are automatically sorted, such as a method of sorting the image data for every medium in which the image data are recorded or for every film from which the image data are obtained and a method of sorting the image data into hierarchical folders for every year/month/day. A method has also been proposed wherein photography date/time information representing a date/time of photography and photography place information representing a place of photography are associated with image data obtained by photography and the image data are sorted based on the photography date/time information and the photography place information (refer to Japanese Unexamined Patent Publication No. 2001-228528). By using these methods of automatically sorting the image data, a user can efficiently organize the image data.

Meanwhile, in a case that image data are sorted, if a subject such as a building and a landscape, included in an image represented by the image data can be recognized, the image data can be sorted according to the subject included in the image. Therefore, a method has been proposed wherein: a sightseeing area is specified based on photography place information; an image of a mountain or a lake in the sightseeing area is retrieved as a reference image; and a composite image is printed by combining the reference image with an image obtained in the sightseeing area (refer to paragraph 0099 in Japanese Unexamined Patent Publication No. 2001-36842). According to this method, it is possible to know in which sightseeing area the image has been obtained by glancing at the composite image. Therefore, the image data can be easily organized.

However, in the method described in Japanese Unexamined Patent Publication No. 2001-36842, the composite image is created by combining a predetermined reference image of the sightseeing area with the obtained image. Therefore, there is a risk that a structure such as a building and a landscape, which is not included in the obtained image is combined with the obtained image.

Meanwhile, if correlation values between a plurality of structure images such as the building and the landscape and the image represented by the image data are obtained, and a structure with the highest correlation value included in a structure image is estimated to be a subject included in the image represented by the image data, only the structure included in the obtained image can be associated with the obtained image. However, since a number of the structures such as the building and the landscape is huge, if correlation values between all of the structure images and the image represented by the image data are calculated, it requires a long time to estimate the subject.

SUMMARY OF THE INVENTION

In view of the foregoing circumstances, it is an object of the present invention to efficiently estimate a subject included in a image.

A subject estimating method according to the present invention includes the steps of specifying a place of photography of image data by referring to photography place information representing the place of photography, attached to the image data, extracting at least one related structure image related to the specified place of photography from structure images regarding a plurality of structures, calculating a correlation value between the related structure image and the image represented by the image data, and estimating that a structure included in a related structure image with the highest correlation value is a subject included in the image represented by the image data.

Any information such as latitude/longitude, an address, and an area name may be used as the "photography place information" as long as it can represent the place of photography. For example, in the case that the image data are obtained by an imaging device with a function of receiving position data from a GPS satellite, the position data received from the GPS satellite may be used as the photography place information. Further, in the case that the imaging device has a function of communicating with a cellular phone communication network, a position of a communicating imaging device can be estimated based on a position of a base station in the cellular phone communication network, and information representing the position which has been estimated in this manner may be used as the photography place information.

The "related structure image related to the specified place of photography" is an image of a building, a landscape or the like which exists statically only in a certain place. Specifically, in the case that the specified place of photography is the Shiba area in Tokyo, an image of Tokyo Tower or Zojo temple may be used as the related structure image related to the specified place of photography.

A structure changes over time. In some cases, a structure which did not exist at a certain time may be built later, or a structure which was built at a certain time may be rebuilt later. Further, regarding a landscape in a certain place, scenery changes over time, due to growth of trees or the like. Therefore, photography date/time information representing a date/time of photography is attached to the image data. In the case that the structure image corresponding to different time periods has been further prepared, the related structure image may be extracted also by referring to the photography date/time information.

Further, in the subject estimating method according to the present invention, in the case that the photography place information includes directional information representing a photographing direction, the related structure image may be extracted also by referring to the directional information.

A subject estimating device according to the present invention includes a specifying means for specifying a place of photography of image data by referring to photography place information representing the place of photography, attached to the image data, an extracting means for extracting at least one related structure image related to the specified place of photography from structure images regarding a plurality of structures, and an estimating means for calculating a correlation value between the related structure image and an image represented by the image data and estimating that a structure included in a related structure image with the highest correlation value is a subject included in the image represented by the image data.

In the subject estimating device according to the present invention, photography date/time information representing a date/time of photography is attached to the image data. In the case that the structure image corresponding to different time periods has been further prepared, the extracting means may be a means for extracting the related structure image also by referring the photography date/time information.

In the subject estimating device according to the present invention, in the case that the photography place information includes directional information representing a photographing direction, the extracting means may be a means for extracting the related structure image also by referring to the directional information.

Further, a program may be provided, for causing a computer to execute the subject estimating method according to the present invention.

According to the present invention, the place of photography of the image data is specified by referring to the photography place information representing the place of photography, attached to the image data. Further, at least one related structure image related to the specified place of photography is extracted from the plurality of structure images. Then, the correlation value between the related structure image and the image represented by the image data is calculated, and the structure included in the related structure image with the highest correlation value is estimated to be the subject included in the image represented by the image data. As described above, in the present invention, since the subject included in the image represented by the image data is specified by calculating the correlation value between only the related structure image related to the place of photography of the image data and the image represented by the image data, it becomes unnecessary to calculate the correlation values between all of the huge number of structure images and the image represented by the image data. Accordingly, the subject included in the image can be efficiently estimated.

Further, in some cases, a structure is rebuilt after over time, or another structure is newly built, or scenery of a landscape changes. Therefore, by extracting the related structure image also by referring to the photography date/time information representing the date/time of photography, attached to the image data, the subject included in the image represented by the image data can be more accurately estimated using the related structure image corresponding to the time periods.

Further, by extracting the related structure image also by referring to the directional information representing the photographing direction, it is possible to reduce a number of the related structure images of which correlation values with the image represented by the image data are calculated. Therefore, the subject included in the image can be more efficiently estimated.

BRIEF DESCRIPTION OF THE DRAWINGS

FIG. 2 illustrates a database structure; and

DESCRIPTION OF THE PREFERRED EMBODIMENTS

Figure 1:
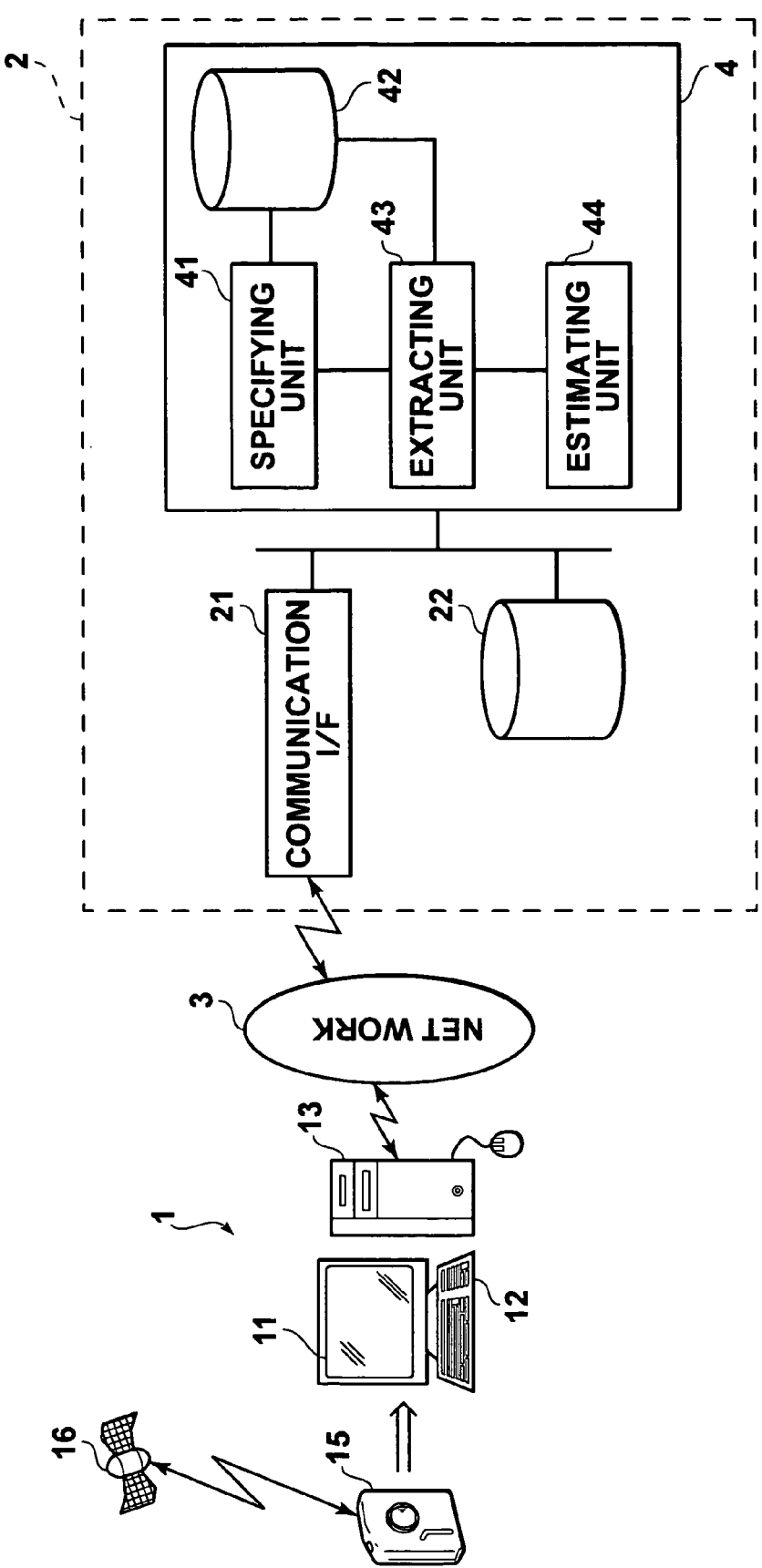
FIG. 1 is a schematic block diagram showing a configuration of an image storage system to which a subject estimating device according to an embodiment of the present invention has been applied.

Hereinafter, embodiments of the present invention will be described with reference to drawings. FIG. 1 is a schematic block diagram showing a configuration of an image storage system to which a subject estimating device according to an embodiment of the present invention has been applied. As illustrated in FIG. 1, in the image storage system according to the present embodiment, a plurality of personal computers 1 and an image server 2 which stores image data are connected via a network 3 such as the Internet. A subject included in an image represented by image data is estimated at the image server 2 by an instruction from the personal computer 1.

The personal computer 1 includes a monitor 11 which displays various data, an input means 12 including a keyboard and a mouse, and a personal computer body 13. The personal computer body 13 includes a communication interface for connecting to the network 3, a CPU, a hard disk, a memory, and the like.

The image server 2 includes a communication interface 21 for connecting to the network, a mass storage unit 22 such as a hard disk, which stores a plurality of image data, and a subject estimating device 4 according to the present embodiment. The mass storage unit 22 stores image data which have been obtained using a digital camera by a user of the personal computer 1. The image data are sorted into folders for each user and stored.

In the present embodiment, a digital camera 15 carried by the user of the personal computer 1 has a function of receiving position data from a GPS satellite 16. The position data represent information regarding a latitude, a longitude, and an altitude at a place of photography and a photographing direction of the digital camera 15. However, in the present embodiment, only the latitude, the longitude, and the photographing direction are used. The information regarding the photographing direction is represented by north, south, east, and west. The position data representing the place of photography and date/time data representing a date/time of photography are attached to the image data obtained using the digital camera 15. Specifically, the position data and the date/time data are attached to the image data by describing the latitude and the longitude at the place of photography and the photographing direction represented by the position data and the date/time of photography, represented by the date/time data in tag information of the image data. The position data and the date/time data may be attached to the image data by storing the position data and the date/time data in a file separately from the image data and associating the position data and the date/time data with the image data.

The subject estimating device 4 includes a specifying unit 41 which specifies the place of photography, the date/time of photography, and the photographing direction of object image data S1 which will become an object of subject estimation by referring to the position data and the date/time data attached to the object image data S1, a storage unit 42 such as a hard disk, which stores a database DB1 in which the place of photography, the years and the photographing direction correspond to structure image data ST representing an image of a structure, an extracting unit 43 which extracts at least one piece of related structure image data ST1 related to the place of photography, the date/time of photography, and the photographing direction of the object image data S1 specified by the specifying unit 41 from the storage unit 42, and an estimating unit 44 which estimates a subject included in an object image represented by the object image data S1.

FIG. 2 illustrates a structure of the database DB1. As illustrated in FIG. 2, in the database DB1, the time periods are described in a layer below the place of photography, the photographing direction is described in a layer below the time periods, and the photographing direction directly corresponds to the structure image data ST so that structure image data ST can be narrowed to the related structure image data ST1 in an order of the place of photography, the time periods, and the photographing direction. In the case that the place of photography is a roughly described place such as "Shiba area", the database does not include a description of the photographing direction. Further, the structure image data ST also correspond to a structure name.

For example, in the database DB1, in the case that the place is the "Shiba area", in a layer below "Shiba area", the years of "till 1957" and "since 1958" are described. Since it is impossible to specify the photographing direction for the "Shiba area", a column of the photographing direction is blank. In a layer below "till 1957", the structure names of "Zojo-temple" and "Shiba Park" and the structure image data ST of "Zojo temple" and "Shiba Park" are described. Further, since the Tokyo Tower was built in 1958, in a layer below "since 1958", a structure name and structure image data ST of the "Tokyo Tower" are described in addition to the "Zojo temple" and the "Shiba Park".

Further, in the case that the place is "Shinjuku Station West Exit", in a layer below the "Shinjuku Station West Exit", years of "till 1991" and "since 1992" are described. In a layer below "till 1991", a photographing direction of "northwest" is described, and in a layer below the photographing direction of "northwest", structure names of "ΔΔ Building" and "□□ Building" and structure image data ST of "ΔΔ Building" and "□□ Building" are described. Meanwhile, the Tokyo Metropolitan Government Office moved to Shinjuku in 1992. Therefore, in a layer below "since 1992", photographing directions of "west" and "northwest" are described, and in a layer below the photographing direction of "west", a structure name and structure image data ST of the "Tokyo Metropolitan Government Office" are described. Further, since "□□ Building" has been torn down, in a layer below the photographing direction of "northwest", a structure name and structure image data ST of only "ΔΔ Building" are described.

Here, in the case that the place of photography, the date/time of photography and the photographing direction represented by the position data and the date/time data attached to the object image data S1 are the Shiba area, Nov. 27, 2002, and north respectively, the extracting unit 43 extracts the structure image data ST of Zojo temple, Shiba Park, and the Tokyo Tower from the database DB1 as the related structure image data ST1. In this case, the column of the photographing direction is blank in the database DB1. Therefore, the photographing direction is not used for extracting the related structure image data ST1.

Further, in the case that the place of photography, the date/time of photography, and the photographing direction represented by the position data and the date/time data attached to the object image data S1 are Shinjuku Station West Exit, Dec. 2, 2002, and west respectively, the extracting unit 43 extracts the structure image data ST of the Tokyo Metropolitan Government Office from the database DB1 as the related structure image data ST1.

The estimating unit 44 calculates correlation values between all of the related structure image data ST1 extracted by the extracting unit 43 and the object image data S1, and obtains related structure image data ST2 with the highest correlation value. Then, the estimating unit 44 estimates that a structure included in an image represented by the related structure image data ST2 is a subject included in the object image represented by the object image data S1, and associates a subject name with the object image data S1. Specifically, by describing the subject name in tag information of the object image data S1, the subject name is associated with the object image data S1.

In the case that only a single related structure image data ST1 is extracted by the extracting unit 43, a structure included in an image represented by the related structure image data ST1 is estimated to be the subject included in the object image represented by the object image data S1.

Here, a size of the structure included in the object image differs depending on a degree of zoom at a time of photography. Therefore, it is preferable to calculate the correlation value by variously changing a size of the related structure image data ST1.

Figure 3:
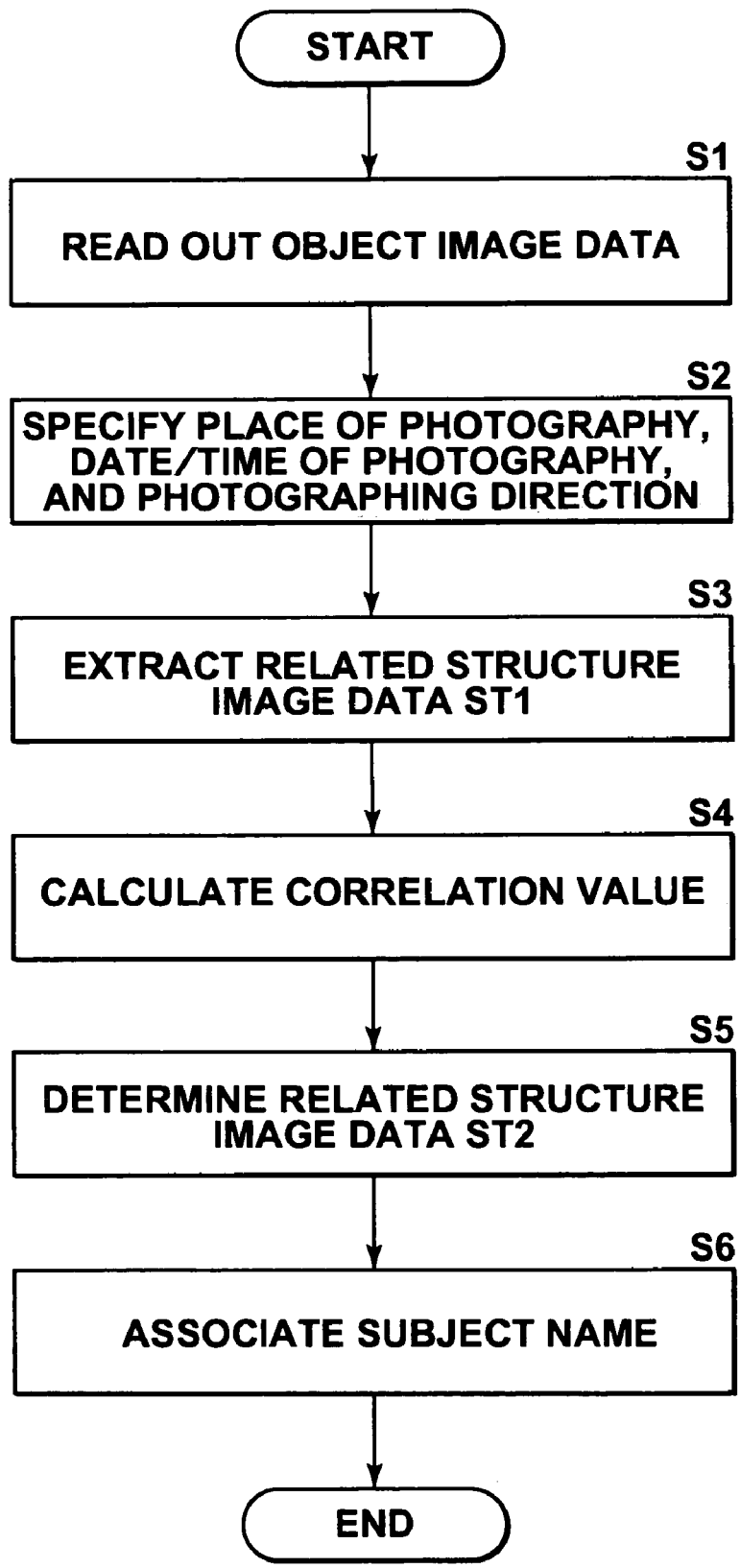
FIG. 3 shows a flow chart illustrating a processing in the present embodiment.

Next, the processing in the present embodiment will be described. FIG. 3 shows a flow chart illustrating the processing in the present embodiment. First, the specifying unit 41 reads out the object image data S1 which will become an object of subject estimation from the mass storage unit 22 by an instruction from the personal computer 1 (step S1). The specifying unit 41 specifies the place of photography, the date/time of photography, and the photographing direction by referring to the position data and the date/time data attached to the object image data S1 (step S2).

Then, the extracting unit 43 extracts at least one piece of related structure image data ST1 related to the place of photography, the date/time of photography, and the photographing direction of the object image data S1 from the database DB1 stored in the storage unit 42 (step S3). The estimating unit 44 calculates the correlation values between all of the related structure image data ST1 and the object image data S1 (step S4), and determines the related structure image data ST2 with the highest correlation value (step S5). Then, the estimating unit 44 estimates that the structure represented by the related structure image data ST2 is the subject included in the object image represented by the object image data S1 (step S6), and ends the processing.

As described above, in the present embodiment, the place of photography of the object image data S1 is specified by referring to the position data attached to the object image data S1. Further, the related structure image data ST1 related to the specified place of photography is extracted from the database DB1, the correlation value between the extracted related structure image data ST1 and the object image data S1 is calculated, the structure included in the image represented by the related structure image data ST2 with the highest correlation value is estimated to be the subject included in the object image represented by the object image data S1, and the structure is associated with the object image data S1. Therefore, it becomes unnecessary to calculate the correlation values between the huge number of structure image data ST and the object image data S1. Accordingly, the subject included in the object image can be efficiently estimated.

In some cases, a structure is rebuilt over time, or another structure is newly built, or scenery of a landscape changes. Therefore, by extracting the related structure image data ST1 from the database DB1 also by referring to the date/time data attached to the object image data S1, the subject included in the object image can be more accurately estimated using the related structure image data ST1 corresponding to the time period when the object image data S1 were obtained.

Further, since the related structure image data ST1 are extracted from the database DB1 also by referring to the photographing direction of the digital camera 15, it is possible to reduce the number of related structure image data ST1 of which correlation values with the object image data S1 are obtained. Accordingly, the subject included in the object image can be efficiently estimated.

In the above embodiment, the related structure image data ST1 are extracted from the database DB1 also by referring to the date/time of photography and the photographing direction in addition to the place of photography. However, the related structure image data ST1 may be extracted from the database DB1 also by referring to the place of photography and one of the date/time of photography and the photographing direction. The related structure image data ST1 may be extracted from the database DB1 also by referring to only the place of photography.

Further, in the above embodiment, the subject estimating device 4 according to the present embodiment is provided in the image server 2. However, it is also possible to estimate the subject included in the object image within the personal computer 1 by storing an application for causing the personal computer 1 to perform a function of the subject estimating device 4 and the database DB1 in the personal computer 1.

What is claimed is:

1. A subject estimating method comprising the steps of:
   specifying a place of photography of image data by referring to photography place information attached to the image data;
   extracting at least one structure image related to the specified place of photography from among structure images regarding a plurality of structures;
   calculating a correlation value between the related structure image and an image represented by the image data; and
   estimating that a structure included in a related structure image with the highest correlation value is a subject included in the image represented by the image data.

2. The subject estimating method as defined in claim 1, wherein the photography place information includes at least one of latitude/longitude, an address, and an area name.

3. The subject estimating method as defined in claim 1, wherein the photography place information is position data received from a GPS satellite by an imaging device which has received the image data.

4. The subject estimating method as defined in claim 1, wherein the photography place information is information representing a position of an imaging device which has obtained the image data, estimated based on a position of a base station in a cellular phone communication network.

5. The image estimating method as defined in claim 1, wherein photography date/time information representing a date/time of photography has been attached to the image data, wherein in a case that structure images corresponding to different periods of time have been further prepared, the related structure image is extracted also by referring to the photography date/time information.

6. The image estimating method as defined in claim 1, wherein in a case that the photography place information includes directional information representing a photographing direction, the related structure image is extracted also by referring to the directional information.

7. A subject estimating device comprising:
   a specifying means for specifying a place of photography of image data by referring to photography place information attached to the image data;
   an extracting means for extracting at least one structure image related to the specified place of photography from among structure images regarding a plurality of structures; and
   an estimating means for calculating a correlation value between the related structure image and an image represented by the image data and estimating that a structure included in a related structure image with the highest correlation value is a subject included in the image represented by the image data.

8. The subject estimating device as defined in claim 7, wherein the photography place information includes at least one of latitude/longitude, an address, and an area name.

9. The subject estimating device as defined in claim 7, wherein the photography place information is position data received from a GPS satellite by an imaging device which has received the image data.

10. The subject estimating device as defined in claim 7, wherein the photography place information is information representing a position of an imaging device which has obtained the image data, estimated based on a position of a base station in a cellular phone communication network.

11. The image estimating device as defined in claim 7, wherein photography date/time information representing a date/time of photography has been attached to the image data, wherein in a case that structure images corresponding to different time periods have been further prepared, the extracting means is a means for extracting the related structure image also by referring to the photography date/time information.

12. The image estimating device as defined in claim 7, wherein in a case that the photography place information includes directional information representing a photographing direction, the extracting means is a means for extracting the related structure image also by referring to the directional information.

13. A computer readable medium having embodied thereon a subject estimating program which, when executed by a computer, performs the steps of:
    specifying a place of photography of image data by referring to photography place information photography attached to the image data;
    extracting at least one structure image related to the specified place of photography from among structure images regarding a plurality of structures;
    calculating a correlation value between the related structure image and an image represented by the image data; and
    estimating that a structure included in a related structure image with the highest correlation value is a subject included in the image represented by the image data.

14. The computer readable medium of claim 13, wherein the photography place information includes at least one of latitude/longitude, an address, and an area name.

15. The computer readable medium of claim 13, wherein the photography place information is position data received from a GPS satellite by an imaging device which has received the image data.

16. The computer readable medium of claim 13, wherein the photography place information is information representing a position of an imaging device which has obtained the image data, estimated based on a position of a base station in a cellular phone communication network.

17. The computer readable medium of claim 13, wherein photography date/time information representing a date/time of photography has been attached to the image data, wherein in a case that structure images corresponding to different time periods have been further prepared, the extracting procedure is a procedure for extracting the related structure image also by referring to the photography date/time information.

18. The computer readable medium of claim 13, wherein in a case that the photography place information includes direction information representing a photographing direction, the extracting procedure is a procedure for extracting the related structure image also by referring to the directional information.

\* \* \* \* \*